Figures 1, 2:
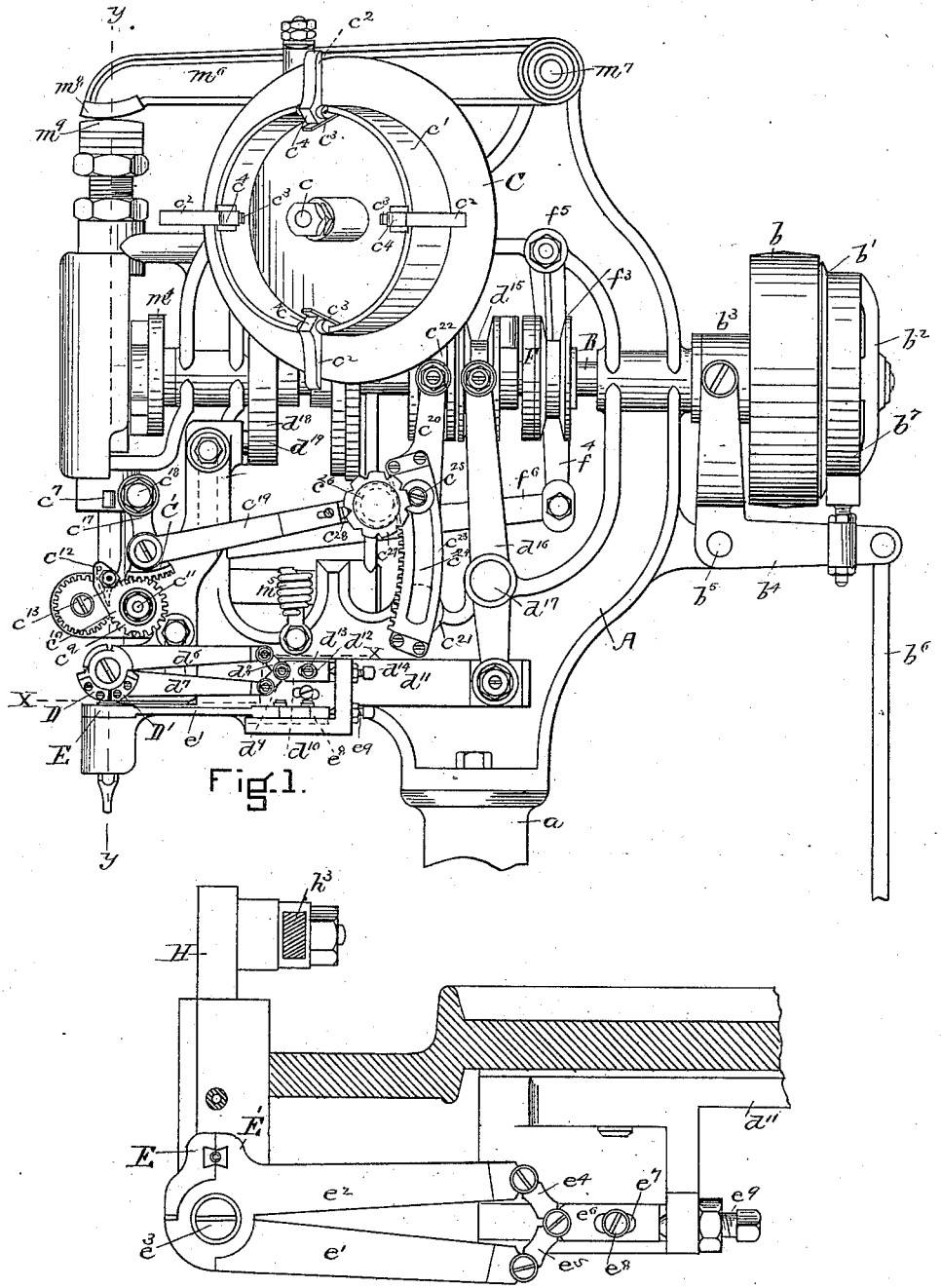

(No Model.) 7 Sheets—Sheet 1.

H. WEEKS & H. D. STONE.
NAIL MAKING AND DRIVING MACHINE.

No. 358,710. Patented Mar. 1, 1887.

WITNESSES
Fred. B. Dolan
J. M. Dolan

INVENTORS
Horace Weeks
Henrie D. Stone
by their atty. Clarke H Raymond (No Model.) 7 Sheets—Sheet 2.

H. WEEKS & H. D. STONE.
NAIL MAKING AND DRIVING MACHINE.

No. 358,710. Patented Mar. 1, 1887.

WITNESSES
Fred. B. Dolan.
J. M. Dolan.

INVENTORS
Horace Weeks
Henry D. Stone
by their atty
Clarke & Raymond (No Model.) 7 Sheets—Sheet 3.

H. WEEKS & H. D. STONE.
NAIL MAKING AND DRIVING MACHINE.

No. 358,710. Patented Mar. 1, 1887.

WITNESSES
Fred. B. Dolan.
J. M. Dolan.

INVENTORS
Horace Weeks
Henrie D. Stone
by their atty Clarke & Raymond (No Model.) 7 Sheets—Sheet 4.

H. WEEKS & H. D. STONE.
NAIL MAKING AND DRIVING MACHINE.

No. 358,710. Patented Mar. 1, 1887.

WITNESSES.
Fred. B. Dolan.
J. M. Dolan.

INVENTORS.
Horace Weeks
Henry D. Stone
by their attys
Clarke & Raymond.

(No Model.) 7 Sheets—Sheet 5.

H. WEEKS & H. D. STONE.
NAIL MAKING AND DRIVING MACHINE.

No. 358,710. Patented Mar. 1, 1887.

WITNESSES.
Fred. B. Dolan.
J. M. Dolan.

INVENTORS
Horace Weeks
Harris D. Stone
by their attys
Clarke & Raymond.

(No Model.) 7 Sheets—Sheet 7.

H. WEEKS & H. D. STONE.
NAIL MAKING AND DRIVING MACHINE.

No. 358,710. Patented Mar. 1, 1887.

WITNESSES.
Fred. B. Dolan.
J. M. Dolan.

INVENTORS.
Horace Weeks
Harris D. Stone
by their attys
Clarke & Raymond

UNITED STATES PATENT OFFICE.

HORACE WEEKS AND HENRIE D. STONE, OF BOSTON, MASSACHUSETTS; SAID STONE ASSIGNOR TO SAID WEEKS.

NAIL MAKING AND DRIVING MACHINE.

SPECIFICATION forming part of Letters Patent No. 358,710, dated March 1, 1887.

Application filed November 1, 1886. Serial No. 217,643. (No model.)

*To all whom it may concern:*

Be it known that we, HORACE WEEKS and HENRIE D. STONE, both of Boston, in the county of Suffolk and State of Massachusetts, both citizens of the United States, have invented a new and useful Improvement in Nail Making and Driving Machines, of which the following is a full, clear, and exact description, reference being had to the accompanying drawings, forming a part of this specification, in explaining its nature.

The object of the invention is to provide mechanism for forming pointed headed nails from wire as a continuous operation, and for feeding them as they are formed in successive order to a nail-driving device; and it comprises a wire-feeding mechanism which advances the wire from which the nails are made to swaging dies or jaws, which act not only to form the points of the nails, but also to assist in forming their heads. It also comprises gripping dies or jaws for holding the nails as they are headed, a severing device and carrier or transferrer for severing the headed nail from the wire and carrying it to a position beneath the driver-rod, and the driver-rod.

At the beginning of the operation of the machine the end of the wire is wasted, and the swaging-dies operate to form the point of the first complete nail and a head upon the wasted end; but from that time on the end of the wire is always pointed and the swaging-dies operate regularly to form the point of the second nail, and are then moved, while closed upon the wire, downward to form the head of the first nail by causing a section of the wire between them and the gripping-dies, which are below them, sufficiently long to provide a head, and which may vary in length, according to the size of the head desired, to be forced into the head-forming cavity of the gripping-dies, so that the point of the nail is formed by swaging, and a head is formed by shortening the wire and causing it to extend laterally. The action of the swaging-dies in swaging and in heading does not sever the headed nail from the wire, and for this reason it is necessary to provide the wire with a double feed—first, the feed movement which advances the wire in the feedway sufficiently to bring the head-forming section of each nail into proper relation to the head-forming recesses of the gripping-dies, and, second, an additional feeding movement of the wire to advance the nail, which otherwise would have its head upon a line with the head of the recesses of the gripping-dies, downward sufficiently to clear the under surface of the gripping-dies to bring the head in line with the upper surface of the carrier or transferrer, so that upon the lateral movement of the carrier the headed nail is severed from the point of the wire or nail-blank immediately above it. The carrier immediately transfers the nail to the driver, which immediately drives it and returns again to its former position, to bring its nail-receiving hole in register with the hole of the gripping-dies, and the wire is then again fed as before.

We have also embodied in the machine mechanism for varying the length of the shank of the nail, so that nails of any desired length may be formed.

The invention also relates to various details of construction and organization, which are hereinafter described.

Figures 3, 4:
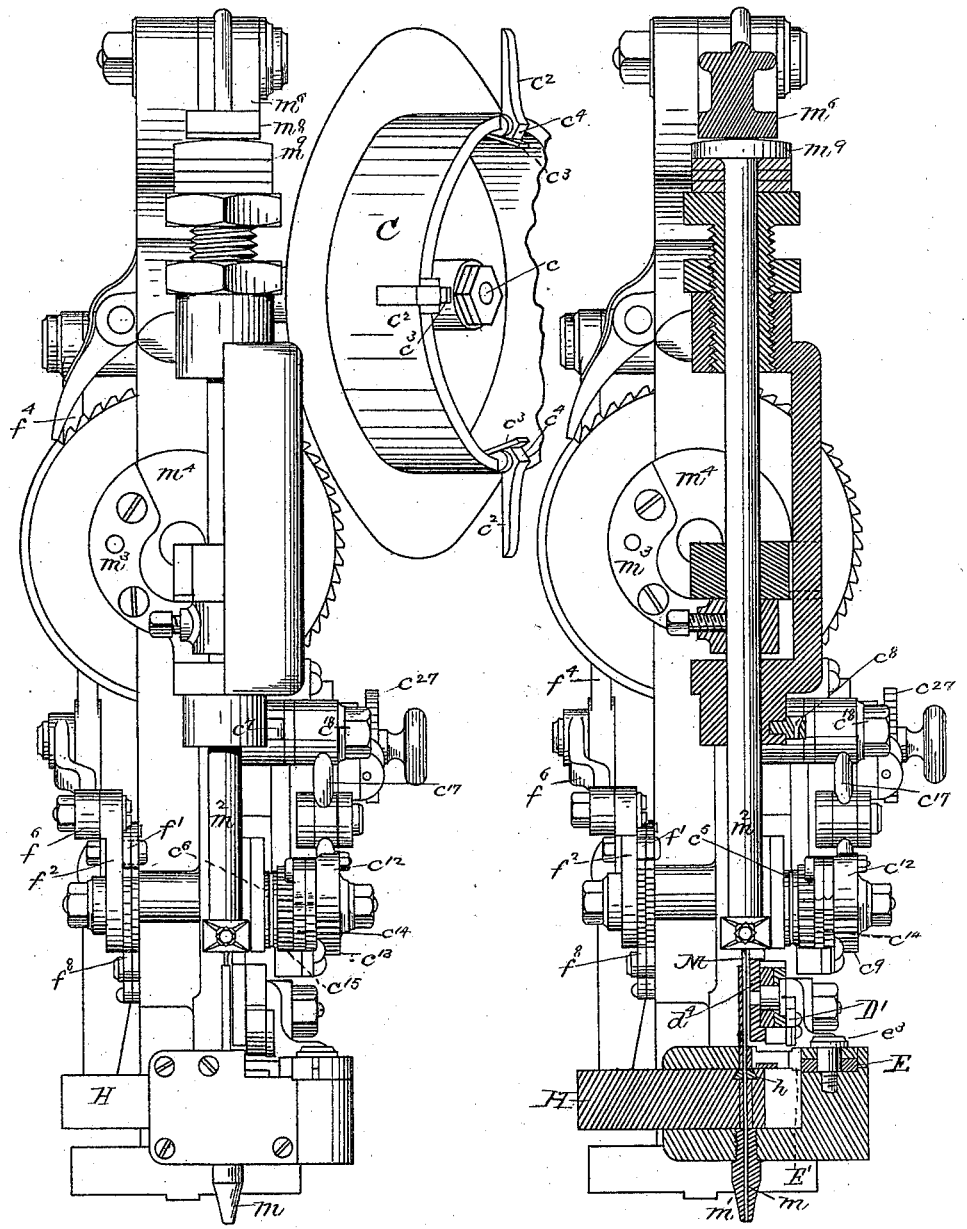
Figure 5:
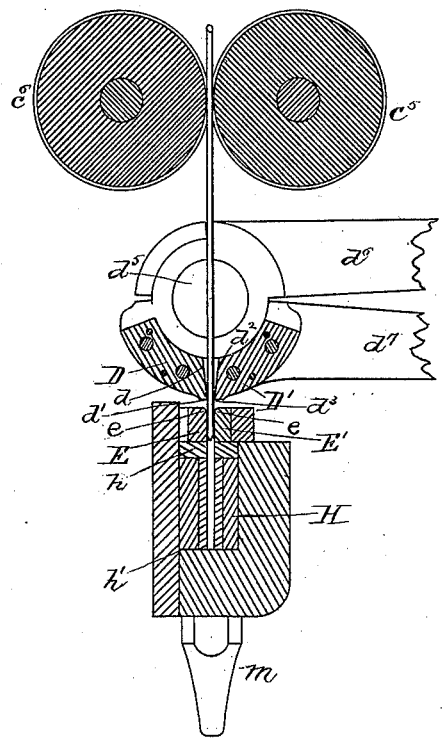
Figure 6:
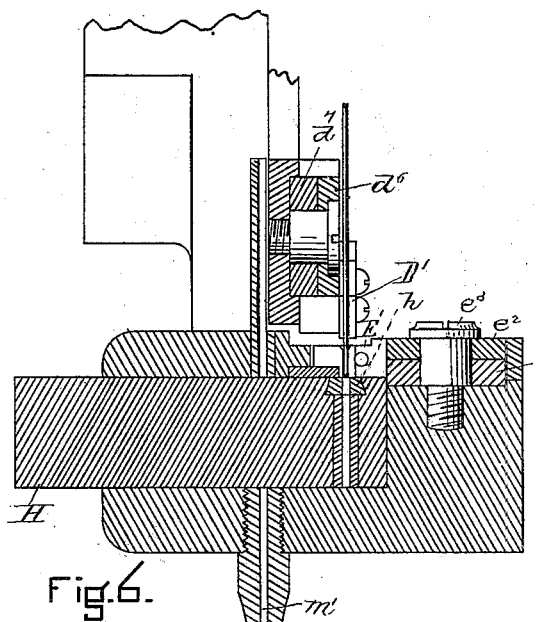
Figures 7, 8:
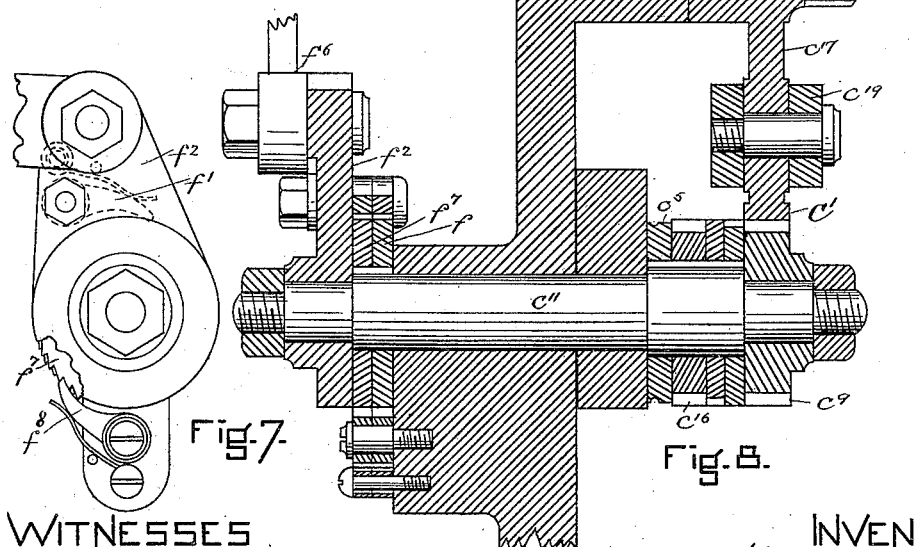
Figure 9:
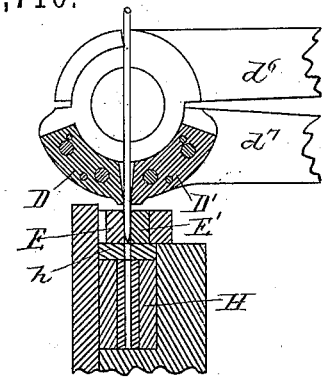
Figure 10:
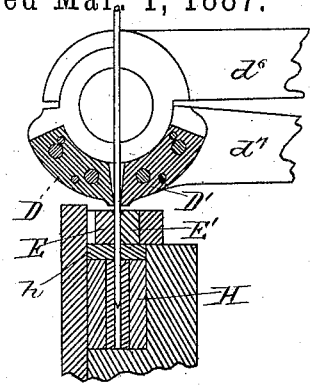
Figure 15:
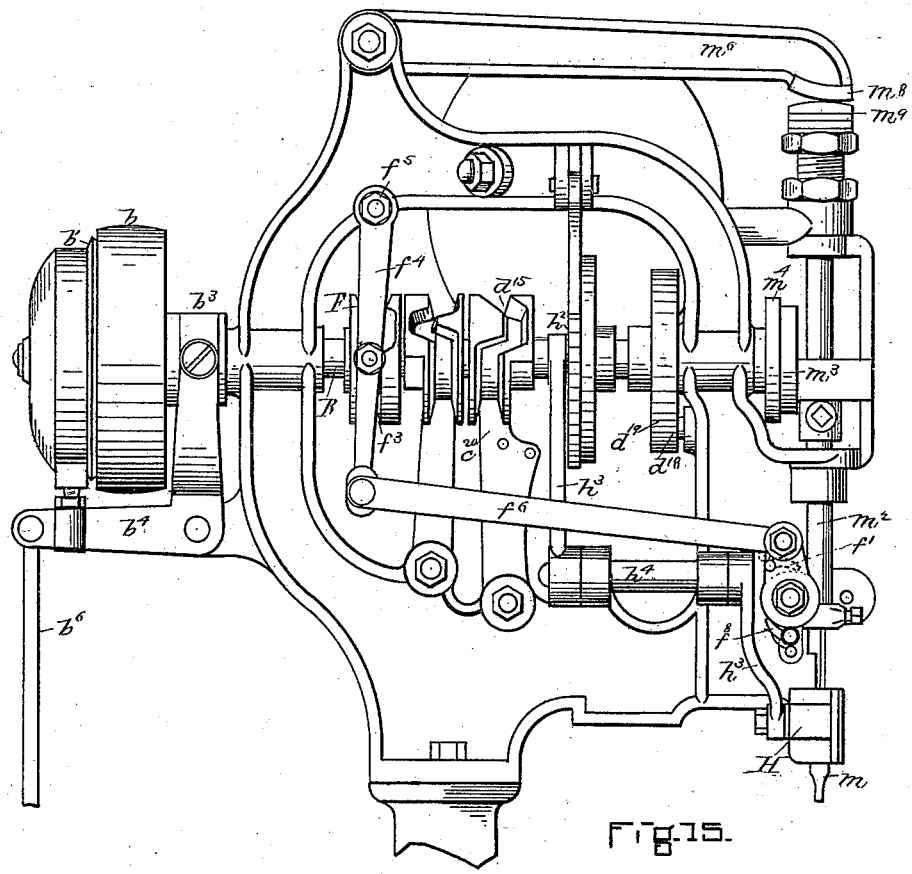
Figure 17:
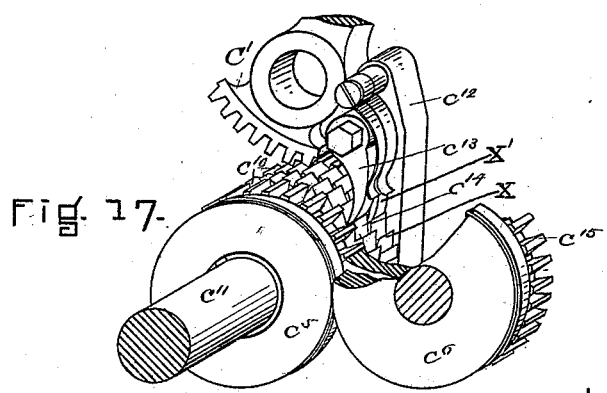
Figure 16:
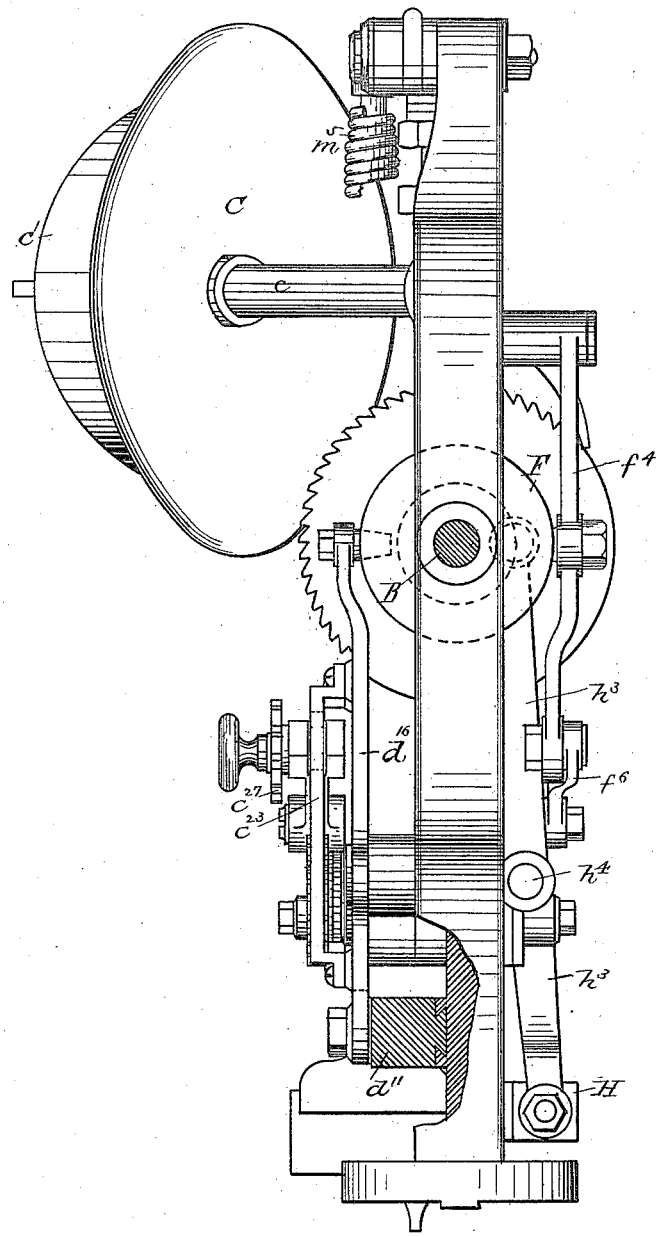
Figure 18:
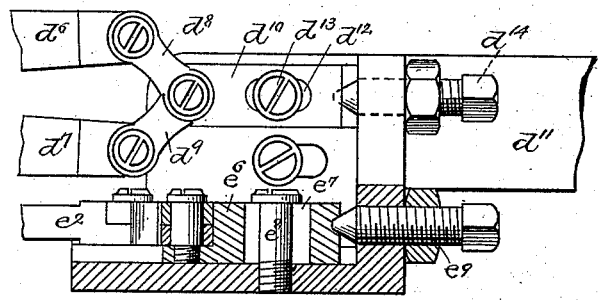
Figure 19:
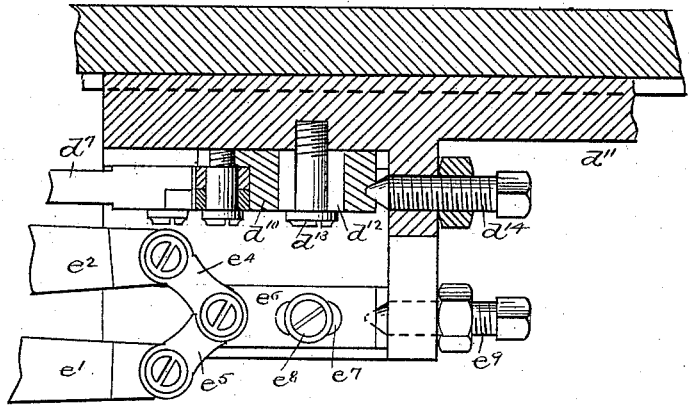
Figure 20:
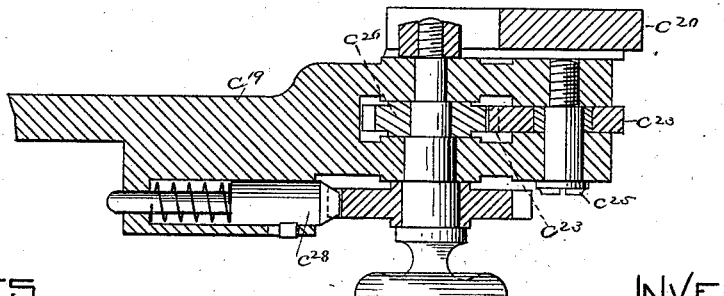

In the drawings, Figure 1 is a side elevation of a machine having the features of our invention. Fig. 2 is an enlarged view in section upon the line $x\ x$ of Fig. 1, and in plan of the parts below this line. Fig. 3 is an elevation, enlarged, of the front end of the machine. Fig. 4 is a view part in vertical section and part in elevation upon and at the rear of the line $y\ y$ of Fig. 1. Fig. 5 is an enlarged sectional view representing the relation of the swaging and heading dies and carrier to each other. Fig. 6 is also an enlarged sectional view to illustrate the relation of the carrier to the swaging, heading, and gripping dies and the throat and nozzle of the machine. Fig. 7 is a detail view in elevation of a portion of the wire-feeding mechanism. Fig. 8 is a horizontal section to illustrate the double feeding mechanism or devices. Figs. 9 to 14, inclusive, are views, principally in section, to illustrate various positions of the swaging, heading, and gripping dies and of the carrier, which will be hereinafter referred to. Fig. 15 is an elevation of the side of the machine at the left of the front. Fig. 16 is a view in rear elevation thereof. Fig. 17 is a detail view in perspective to illustrate a part of the mechanism for operating the feed-rolls. Figs. 18, 19, and 20 are detail views, to which reference will hereinafter be made.

In the drawings, A is the frame of the head of the machine. It is mounted upon the post or stand $a$. It supports the main shaft B, which carries the cams for operating the feeding mechanism, the swaging and heading dies, the gripping-dies, the carrier and severing block, and the nail-driving rod. It also supports the driving member $b$ of a clutch, the driven member $b'$ thereof, which is fastened to the shaft B, and the brake-wheel $b^2$, which forms a part of the driven member of the clutch. The driving member $b$ has a long hub, $b^3$, and is movable upon the shaft to and from the driven member $b'$ by means of the bent lever $b^4$, pivoted at $b^5$, and the rod $b^6$, attached to a treadle. The lever $b^4$ also carries the friction-brake ring $b^7$, which bears upon the surface of the brake-wheel $b^2$, so that the act of moving the driving member $b$ of the clutch out of contact with the driven member brings the friction-brake to bear upon the brake-wheel, and stops the rotation of the shaft B.

The wire is supported by the reel C, which is mounted upon a spindle or post, $c$, extending diagonally from the frame of the machine, upon which it is free to rotate. It has a barrel, $c'$, upon which the coil of wire bears or is held, and the separate or independent fingers $c^2$, which are pivoted to the edge of the drum to swing outward in relation thereto, so as to occupy two positions—first, a position substantially parallel with the surface of the drum, and, second, a position at right angles thereto, or, as represented in Fig. 3, to hold the coiled wire upon the reel. Each finger is held in these positions by means of the flat spring $c^3$ and the flat surfaces $c^4$ at the inner ends of the fingers, the surfaces being so arranged that the spring serves to hold the finger either in or out, according to the surface upon which it bears. The wire is led from the reel to the feed-rolls $c^5$ $c^6$ through the hole $c^7$ (see Fig. 1) and the guide $c^8$. (See Fig. 4.)

The feed-rolls $c^5$ $c^6$ are rotated or moved only during the feeding of the wire, and are maintained in constant contact therewith, and we consider this an improvement upon the form of feeding mechanism employing two constantly-rotating feed wheels or rolls, one of which is moved away from the other to stop the feed of the wire, as they constantly hold the wire and are more positive in their action, and less likely to slip upon the wire. Of course these rolls have grooves in their peripheries which match and form the passage for the wire. These feed-rolls are first operated to move the wire only a certain part of the entire feed movement necessary for feeding an entire or complete nail—that is, to feed the wire the length of a nail less the length of so much thereof as is held by the gripping device or dies, and from which the head is formed. As, however, the rolls must be again moved to feed the wire a distance equivalent to the remainder of the length of a complete nail, or, to be more definite, the length of the gripping-dies, and as it is necessary to employ other mechanism for giving the feed-rolls this additional feeding movement, we have represented the first feed movement as obtained by means of a gear, $c^9$, formed upon a plate, $c^{10}$, which is carried by the shaft $c^{11}$ of the roll $c^5$, but which is not fast thereto. This plate $c^{10}$ has an arm, $c^{12}$, which carries a pawl, $c^{13}$, arranged to engage the ratchet-wheel $c^{14}$, which is fast to the feed-roll shaft $c^{11}$, so that upon the partial rotation or movement of the plate $c^{10}$ in one direction the feed-rolls are rotated, while upon its movement in an opposite direction the feed-pawl rides upon the ratchet-wheel and communicates no movement to the rolls.

The feed-roll $c^6$, it will be understood, is connected with the feed-roll $c^5$ by means of the gear $c^{15}$ and gear $c^{16}$. The plate $c^{10}$ is provided with a partial rotation forward and back upon the shaft $c^{11}$ by means of the sector C' at the end of the arm $c^{17}$, pivoted at $c^{18}$, the link $c^{19}$, the lever $c^{20}$, pivoted at $c^{21}$, and operated or moved at intervals by the cam-groove $c^{22}$ in a cam-disk on the main shaft B. This lever $c^{20}$ has a cam-pin entering the cam-groove, and it supports an arc rack, $c^{23}$, which has a slot, $c^{24}$, which receives and holds the end of the link $c^{19}$, the end of the link being provided with a vertical movement in this slot to vary the length of the throw of the sector C', and consequently the extent of rotation or movement of the plate $c^{10}$ and of the feed-rolls.

The nearer the end $c^{25}$ of the link is to the fulcrum of the lever $c^{20}$ the less the movement of the feed-rolls. To change the position of this end of the link in relation to the fulcrum, and also to lock it in any desired position, and also to provide an indicator which shall indicate the length of the nail to which the feed is set, we have secured to the link $c^{19}$ a stud carrying a gear, $c^{26}$, which meshes with the arc rack, and the stud also has a notched disk, $c^{27}$, fastened to it. The link $c^{19}$ also carries the spring bolt or pin $c^{28}$, which is arranged to engage the notches of the disk $c^{27}$ and lock it and the gear, and consequently the link, in any desired position, so that to move the end of the link upon the lever $c^{20}$ it is necessary to disengage the spring-pin from the disk $c^{27}$ and then turn the disk to move the link either up or down, as required, and when the feed has been set the pin again engages the disk and locks the link to the lever $c^{20}$ in its new position. The plate $c^{27}$ may have numbers set against the various notches to indicate the various sizes of the nails obtained.

It will be seen from what we have said that upon the movement of the lever $c^{20}$ by the cam the sector C' causes the feed-rolls to be positively moved in a direction to feed the wire, while upon the reverse movement the pawl $c^{13}$ rides on the ratchet-wheel $c^{14}$ and the shaft $c^{11}$, and the feed-rolls remain stationary. This feeding movement of the rolls advances the wire to the position shown in Fig. 10, and presents it to the swaging dies or jaws D D'.

The die D has the swaging surface or recess $d$ and the heading-surface $d'$, and the swaging-die D' has the swaging surface or recess $d^2$ and the heading-surface $d^3$. The two dies are pivoted or connected with each other and with the slide-plate $d^4$ by means of a stud, $d^5$. The die or jaw D has the long horizontally-extending arm $d^6$, and the die or jaw D' an arm, $d^7$, of similar shape and extent.

The dies are pivoted or connected, so that they may be moved toward each other to swage a point and from each other to release the wire and permit it to be fed. They are thus moved by means of a toggle, $d^8$ $d^9$, connected, respectively, with the ends of the arms $d^6$ $d^7$ and with the adjustable block $d^{10}$, carried by the slide-plate $d^{11}$. This block $d^{10}$ is made adjustable upon its operating-plate, so as to set or adjust the working or swaging surfaces of the dies, and this adjustment is obtained by means of a slot, $d^{12}$, in the block and a locking-screw, $d^{13}$, and an adjusting and holding screw, $d^{14}$.

The swaging and heading device or dies are not only given movements to swage the point of the nail, but they are also given movements whereby they are caused to act as a heading-tool. It is therefore necessary that they be operated first to close on the wire to swage or shape the point, and while thus held closed upon the wire to be moved vertically downward to the gripping-dies E E', and thereby upset or form the head of the preceding pointed section of the wire by shortening the wire or causing the section of the wire between the lower end of the head-forming cavity or recess $e$ of each gripper of the surfaces $d'$ $d^3$ of the jaws D D' to be extended laterally into said cavity or recess and fill it, and thereby form an upset head which shall extend on all sides of the wire.

The closing and opening movements and the movement by which the dies are held closed as they move vertically are provided by the cam-groove $d^{15}$ in a cam-disk upon the shaft B, the lever $d^{16}$, fulcrumed at $d^{17}$, and connected with the end of the slide $d^{11}$. (See Fig. 1.) The vertical movement is provided the swaging-dies and header by means of the cam-groove $d^{18}$ in the cam-disk $d^{19}$ upon the shaft B, and the slide-plate $d^4$, to which the jaws or dies D D' are pivoted. It is suitably guided and has a cam-pin which enters the cam-groove $d^{18}$, so that at the proper interval of time the swaging and heading dies are moved downward, and, after acting to form a head in connection with the gripping-dies, are returned to their original position.

The gripping-dies E E' are shown in Fig. 2, and are very like in construction the swaging-dies. Each die has a section of the head-forming cavity or recess $e$ and a section of the feed-way through which the wire or nail is fed when the gripping-dies are open. The gripping-die E has the arm $e'$ (see Fig. 2) and the gripping-die E' has the arm $e^2$. The two dies are connected by the stud $e^3$. As they are moved toward and from each other simultaneously with the closing and opening movements of the swaging-dies they are operated by the slide $d^{11}$, and they are connected therewith in the same manner that the arms $d^6$ $d^7$ of the swaging-dies are connected—namely, by a toggle, $e^4$ $e^5$, connected with the ends of the levers or arms $e'$ $e^2$, and with the adjustable block $e^6$, which is moved upon the slide by means of the slot $e^7$, and locking and guiding bolt $e^8$, and the adjusting and holding screw $e^9$. The block is provided with this adjustment for the purpose of adjusting the time of the movements of the jaws E E'. From this it will be seen that the gripping-dies are closed upon the wire simultaneously with the closing of the swaging-dies, and that they remain closed upon the wire to hold it during the downward movement of the swaging-dies in forming the head. They are also opened at the same time that the swaging-dies are opened, to permit the headed blank or nail—as the swaging-dies, as we have before indicated, do not act to sever the blank from the wire before it is headed, or during the heading operation—to be moved sufficiently to disengage it from the gripping-dies—that is, to move it until its head-forming portion shall occupy the position shown in Fig. 13.

Figure 11:
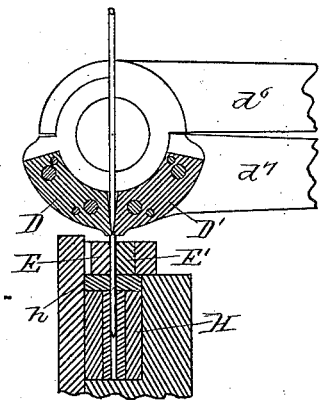
Figure 12:
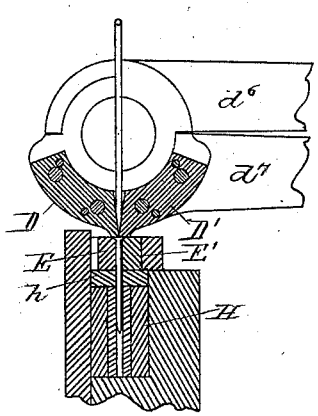
Figure 13:
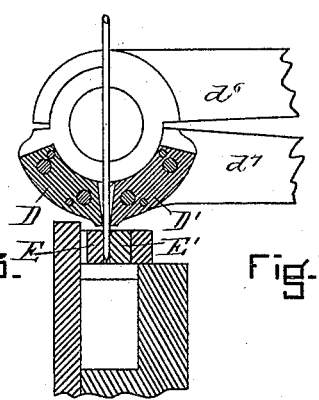
Figure 14:
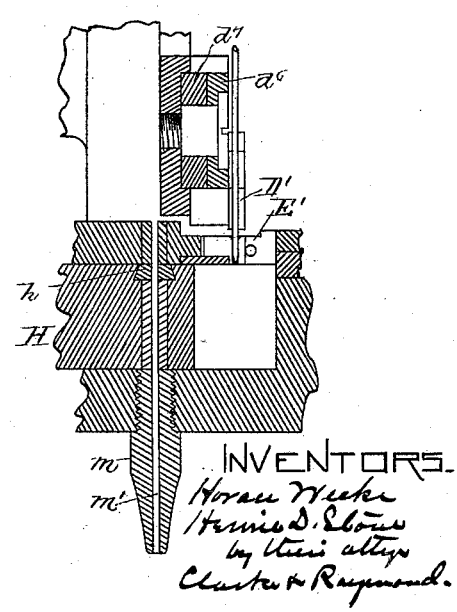

We would here remark that the position of the swaging-dies and gripping-dies after they have closed upon the wire, before the head is formed, is well shown in Fig. 11, and that the position of these parts upon the completion of the formation of the head is shown in Fig. 12.

The additional feeding movement of the wire now takes place, and this is provided by the feed-rolls $c^5$ $c^6$, which are now operated by a different actuating mechanism, which comprises the ratchet-wheel $f$, which is made fast to the shaft $c^{11}$, and pawl $f'$, arranged to engage the ratchet-wheel, and carried by a lever, $f^2$, fulcrumed on the end of the shaft $c^{11}$, and provided with the necessary oscillating movement for causing the pawl to engage the ratchet-wheel to turn the shaft $c^{11}$ by means of the cam-groove $f^3$ in a cam-disk, F, upon the shaft B, the lever $f^4$, fulcrumed at $f^5$, and the link $f^6$. (See Fig. 15.) This additional movement of the feed-wheels can take place, as the ratchet-wheel which the feed-pawl $c^{13}$ engages simply rides by the end of the pawl, which remains stationary. The shaft $c^{11}$ is prevented from being turned backward by the ratchet-wheel $f^7$ and the detent-pawl $f^8$. This additional movement or feed of the wire is of course timed to take place after the head has been formed, and the wire is then moved sufficiently to bring the entire blank into the carrier H, and with the upper surface of the head flush with the upper surface of the cutting-block $h$ of the carrier. The carrier is then moved in a suitable guideway or passage, $h'$, of the machine by means of the cam $h^2$ upon the main shaft B, and rock-lever $h^3$, which is fulcrumed at $h^4$, and which is connected with the outer end of the carrier or slide. The movement of the carrier or slide which then takes place severs the nail from the pointed end of the wire close to the top of the head, so that the point of the next nail is then completed, and it advances the complete nail to a position which brings it in line with the throat or driveway $m$, and the driver-rod M is then released and drives the nail from the passage through the driveway in the nozzle $m'$ into the stock. The carrier is then immediately returned to its original position and the wire advanced by the first feed, and the machine continues to operate as before.

The driver-rod M is supported or carried by the driver-bar $m^2$, which has suitable bearings in the frame of the machine, is lifted by the lifting-cam $m^3$ upon the cam-disk $m^4$ at the end of the main shaft B, which is adapted to engage a projection thereon and lift it in opposition to the actuating-spring $m^5$, a part of which is shown in Fig. 1, and to hold it lifted until the cam is moved sufficiently far to clear the projection, when the spring operates to throw the bar downward. The spring is a long coiled spring connected at its lower end to the frame of the machine and at its upper end to the lever $m^6$, which is fulcrumed at $m^7$ to the frame of the machine, (see Fig. 1,) and has the rounded end $m^8$, which bears upon the rounded head $m^9$ of the driver-bar. Of course the cam $m^3$ is shaped to move the driver-rod from the carrier promptly, and to hold the driver-bar until the time for permitting the spring to act to drive the nail.

The operation of the machine is this: The wire is advanced by the first feed to the swaging and heading dies, it being understood of course that the end of the wire has been already pointed by a previous action of the swaging-dies, and has been fed between the gripping-dies, with its shank extending into the carrier. The swaging-dies then form the second point, without, however, severing the section of wire previously pointed, the gripping-dies having been closed the same instant the feed is released, so that the swaging-dies move downward, drawing the wire and forming the head by shortening the wire, so to speak—that is, the section of wire between the gripping-dies and swaging-dies is upset to form the head. The swaging-dies and gripping-dies immediately return to their original position, and the second feed takes place. The carrier is immediately operated to sever the nail from the wire and advance it to the driver, and the driver operated to drive it and return, and the carrier moved back to receive the shank of the next blank or nail as the wire is fed.

It will be noticed that the swaging-dies operate in the act of heading a nail-blank to draw from the reel through the feed-rolls a length of wire equivalent to the length of that portion of the wire which is upset in forming the head, or, in other words, that section between the head-forming recess of the gripping-dies and the under surface of the swaging-dies before they are moved downward, so that in making each nail there are, in fact, three movements of the wire from the reel.

If desired, there may be employed, in addition to the detent-pawl and ratchet above described, a second detent-pawl, $x$, and ratchet $x'$; but two ratchets and detent-pawls are used only when it is desired to obtain a very fine adjustment or movement of the feeding devices, and when used the teeth of the holding-ratchets are half the length of the teeth of the driving-ratchets used for operating the feed-rolls, and the holding-ratchets are so placed in relation to each other that the teeth of one ratchet shall be slightly in advance of the teeth of the other, say one-half the length of the tooth.

Having thus fully described our invention, we claim and desire to secure by Letters Patent of the United States—

1. In a nail making and driving machine, in combination with nail-driving devices and with wire-feeding mechanism, the point-swaging dies D D', adapted to have horizontal movements toward and from each other and vertical movements imparted to them, with the grasping-dies E E', adapted to have closing and opening movements imparted to them, substantially as specified, and arranged below said swaging-dies, substantially as described.

2. The combination, in a machine for making and driving nails, of devices for feeding wire, the point-swaging dies D D', adapted to have horizontal closing and opening movements and also vertical movements imparted to them, with the grasping-dies E E', arranged below said swaging-dies, having the heading-cavity $e$ and adapted to have closing and opening movements imparted to them, with the nail-carrier H, all substantially as described.

3. The combination, in a machine for making and driving nails, of devices for feeding the wire to the point-swaging and heading mechanism, the said swaging and heading mechanism comprising the dies D D' and the dies E E', which last-named dies have the head-forming cavity $e$, the nail carrier or transferrer H, and reciprocating nail-driving devices, substantially as described.

4. The combination of wire-feeding mechanism with the swaging-dies D D', adapted to form a point-forming section in the wire the length of one complete nail from the end of the wire, the grasping-dies E E', having a heading-recess, $e$, adapted to grasp the wire during the downward movement of the pointing-dies D D' in relation thereto, the carrier H, having a cutting die-block, $h$, adapted to sever the headed nail from the point of the next nail-blank in order, and to transfer it to the driving devices, with said driving devices, substantially as described.

5. The combination of the dies D D', having movements imparted to them substantially as specified, the grasping-dies E E', having the heading-recess $e$, the transferrer H, having the nail cutting or severing block $h$, with a wire-feeding mechanism adapted to feed the wire first to the action of the pointing-dies D D', and then from thence to the transferrer, substantially as described.

6. The combination of the positively-driven feed-rolls $c^5$ $c^6$, having an intermittent movement provided them by means of a ratchet-wheel upon the shaft of the roll $c^5$, and a pawl, $c^{13}$, carried by an oscillating arm, $c^{10}$, which is moved at the desired interval by the cam $c^{22}$, lever $c^{20}$, link $c^{19}$, and sector $c^{17}$, pivoted at $c^{18}$, to engage the teeth or gear upon the arm $c^{10}$, substantially as described.

7. The combination of the feed-rolls $c^6$ $c^5$, geared together, the ratchet-wheel on the shaft of the feed-roll $c^5$, a pawl, $c^{13}$, carried by a swinging arm, $c^{19}$, and oscillated by the cam $c^{22}$, lever $c^{20}$, link $c^{19}$, sector $c^{17}$, and gear $c^9$, and devices for moving the end of the link $c^{19}$ upon the lever $c^{20}$, to vary the throw of the sector and the movement of the feed-rolls, substantially as described.

8. The combination of the lever $c^{20}$, operated by the cam, the arc rack $c^{23}$, attached to said lever, the link $c^{19}$, connected with the lever by means of the notched plate $c^{27}$, having a gear-wheel, $c^{26}$, the pin or stop $c^{28}$ on the link $c^{19}$, with which the said plate engages, whereby the position of the end of the link in relation to the fulcrum of the lever can be varied, substantially as described.

9. The combination of the feed-rolls $c^6$ $c^5$, the shaft $c^{11}$ on the roll $c^5$, the ratchet-wheel carried at each end of the shaft, a pawl, $c^{13}$, for engaging the ratchet-wheel $c^{14}$, and the pawl $f'$, for engaging the ratchet-wheel $f$, and mechanism, substantially as specified, for moving first one pawl and then the other to impart to the wire successive movements in forming one nail, substantially as described.

10. The combination of the feed-rolls $c^5$ $c^6$, the shaft $c^{11}$, ratchet-wheels $c^{14}$ $f$, the pawls $c^{13}$ $f'$ for engaging them, the cams $c^{22}$ $f^3$, and mechanism connecting the cams with the pawls, substantially as described.

11. The combination of the dies D D', their actuating-arms $d^6$ $d^7$, pivoted together by the pivot $d^5$, the said pivot $d^5$, the toggle $d^8$ $d^9$, the slide-block $d^{11}$, cam $d^{15}$, and lever $d^{16}$, all substantially as described.

12. The combination of the dies D D', their arms $d^6$ $d^7$, the links $d^8$ $d^9$, and the adjustable slide-block $d^{10}$, substantially as described.

13. The combination of the dies D D', their arms $d^6$ $d^7$, links $d^8$ $d^9$, block $d^{10}$, having the slot $d^{12}$, the set-screw $d^{14}$, and the bolt or screw $d^{13}$, as and for the purposes described.

14. The combination of the grasping-dies E E', their actuating-arms $e'$ $e^2$, shaped as specified and pivoted together by the pivot $e^3$, the said pivot $e^3$, the links $e^4$ $e^5$, the slide-block $d^{10}$, cam $d^{15}$, and lever $d^{16}$, substantially as described.

15. The combination of the dies E E', the arms $e'$ $e^2$, links $e^4$ $e^5$, and adjustable block $e^6$, substantially as described.

16. The combination of the grasping-dies E E', the arms $e'$ $e^2$, the toggle $e^4$ $e^5$, the block $e^6$, having the slot $e^7$, the locking-screw $e^9$, and bolt or screw $e^8$, substantially as described.

17. The combination of the swaging and heading dies D D', the arms $d^6$ $d^7$, the toggle $d^8$ $d^9$, the grasping-dies E E', having the heading-recess $e$, their arms $e'$ $e^2$, toggle $e^4$ $e^5$, the slide-block $d^{11}$, lever $d^{16}$, and cam $d^{15}$, substantially as described.

18. The swaging-die D, having the swaging-recess $d$, the heading-surface $d'$, the long arm $d^6$, extending substantially at a right angle therefrom, with the die D', having the swaging-recess $d^2$ and heading-surface $d^3$, provided with the long arm $d^7$, extending substantially at a right angle therefrom and very nearly parallel to the arm $d^6$, and below it, the said dies being pivoted together by a stud, $d^5$, substantially as described.

19. The combination of the grasping-die E, having a recess which forms a portion of the feedway of the machine and a section of the heading recess or cavity $e$, and provided with a long arm, $e'$, extending substantially at a right angle to the die, the die E', having a recess forming a portion of the feedway of the machine and a section of the head-forming cavity, also provided with a long arm, $e^2$, extending substantially at right angle thereto and very nearly parallel with the arm $e'$, the said dies being pivoted together by a stud, $e^3$, as and for the purposes described.

20. The combination of the swaging-dies D D', having point-swaging recesses $d$ $d^2$ and the head-forming surfaces or bunter $d'$ $d^3$, and pivoted to a slide-plate, said slide-plate, the cam $d^{15}$, and cam-pin connecting the slide-plate with the cam-groove $d^{18}$, substantially as described.

21. The combination of the dies E E', having the feedway and head-forming cavity, the point-swaging dies D D', having the bunter or heading-surface $d'$ $d^3$, a cam, $d^{15}$, and devices connecting it with the dies E E' and the point-swaging dies D D', whereby the dies of each set are caused to be simultaneously moved toward and from each other, the cam-groove $d^{18}$, a slide-plate operated by said cam-groove and to which the dies D D' are pivoted, and the wire-feeding rolls $c^5$ $c^6$, having the feed movements specified, substantially as described.

22. The combination of the feed-rolls $c^6$ $c^5$, the shaft $c^{11}$ of the feed-roll $c^5$, ratchet-wheel $f$, pawl $f'$, carried by the swinging arm $f^2$, cam $f^3$, lever $f^4$, and link $f^6$, substantially as described.

23. The combination, in a machine for making headed nails from wire and driving them, of the vertically-movable point-swaging and heading dies, the horizontally-movable nail-blank-grasping dies, having a head-forming cavity, a horizontally-movable transferrer and severing device, a reciprocating driver, and wire-feeding mechanism adapted to grasp the wire continuously and to move it twice in feeding the length of one nail, whereby the wire is first fed to the swaging-dies and is then headed, and is then moved from the swaging-dies to bring the headed blank within the transferrer, substantially as and for the purposes described.

24. The combination of the wire-feed rolls $c^5$ $c^6$, geared together, the roll $c^5$ being free to revolve in a direction to feed the wire, with the point-swaging and heading dies D D', having horizontal movements, and means for moving the dies vertically in relation to the feed-rolls in forming a head upon the nail-blank, all substantially as and for the purposes described.

HORACE WEEKS.
HENRIE D. STONE.

Witnesses:
F. F. RAYMOND, 2d,
J. M. DOLAN.